Patented Nov. 15, 1938

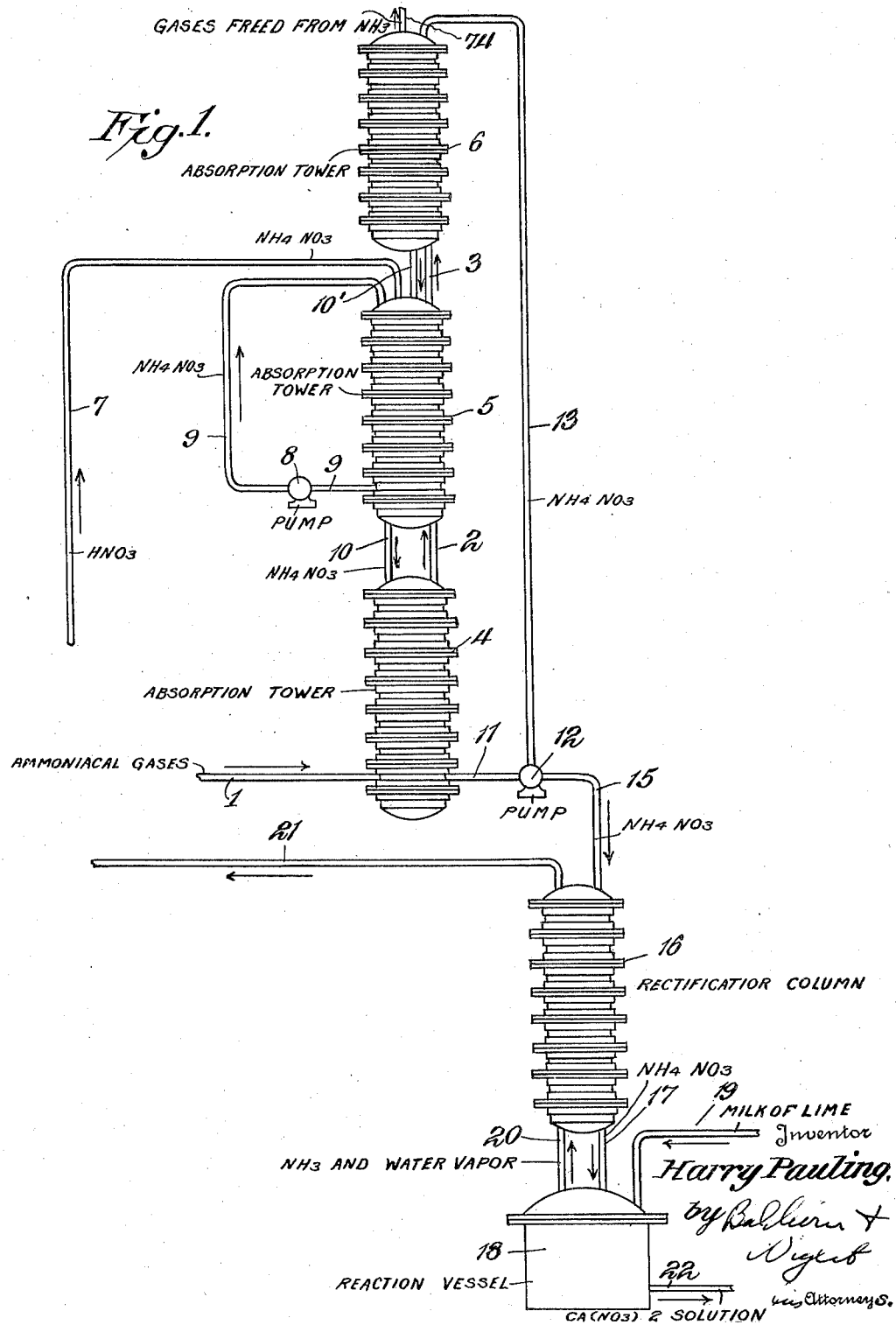

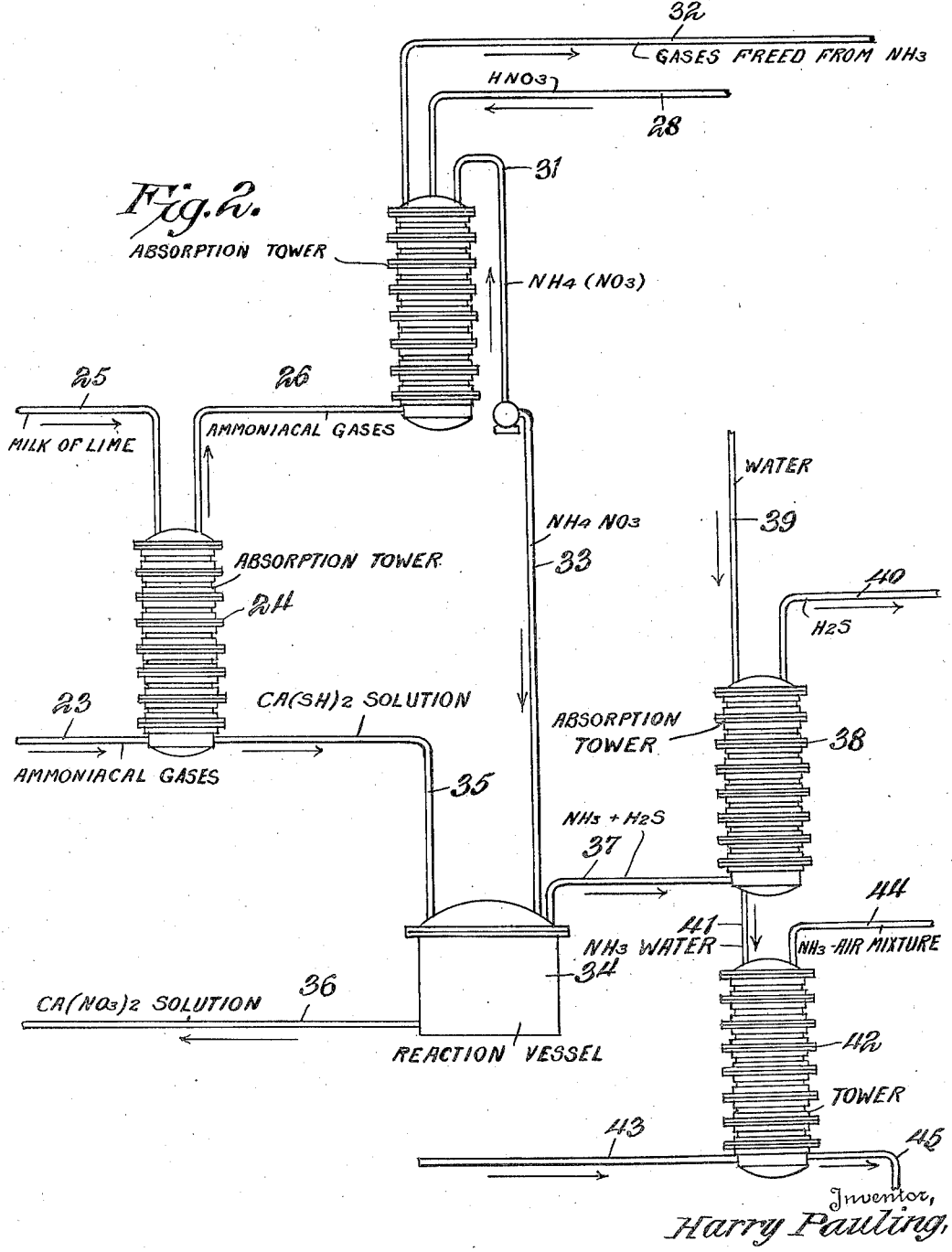

2,136,994

UNITED STATES PATENT OFFICE 2,136,994

MANUFACTURE OF CALCIUM NITRATE FROM AMMONIACAL GASES

Harry Pauling, Berlin, Germany

Application April 28, 1937, Serial No. 139,583
In Germany May 19, 1936

10 Claims. (Cl. 23—102)

It is known that the ammonia contained in the gases resulting from the distillation or gasification of fuels may be converted into ammonium sulphate by means of sulphuric acid. Although a serviceable fertilizer is produced directly in this process, the costs of production of the sulphuric acid are a serious burden on the cost of manufacture of the ammonium sulphate. Furthermore, the nitrogen in the ammonium sulphate occurs in a form which is very inferior, in respect of its fertilizer effect, to other forms of nitrogen, more particularly to nitrate nitrogen. In addition, the ammonium sulphate contains free sulphuric acid which is troublesome on long storage, particularly in certain forms of package.

The invention is based on the problem of converting the ammonia contained in the gases resulting from the distillation or gasification of fuels into a high-grade fertilizer, namely, calcium nitrate, and producing the nitric acid necessary for the absorption of the ammonia from the ammonia itself. For this purpose, the gases freed in the usual manner from flue dust, tar and hydrogen sulphide, are treated with aqueous nitric acid or ammonium nitrate solution containing nitric acid and the ammonium nitrate solution obtained is reacted with burnt lime. There are formed calcium nitrate solution and gaseous ammonia, which latter is converted by catalytic oxidation into the nitric acid necessary for the absorption of the ammonia.

It is known that in the action of gaseous ammonia on nitric acid, mist consisting of ammonium nitrate in an extremely finely divided form is very easily formed. The formation of mist which involves considerable difficulty in bringing it into a useful form may be suppressed by employing dilute nitric acid. The quantity of liquor produced, however, is thereby increased to such an extent that considerable expenditure of technical and economical means is required for its evaporation.

These disadvantages are obviated by the known absorption of ammonia by means of an ammonium nitrate solution containing nitric acid. The content of nitric acid in the solution depends upon the concentration of ammonia and is proportioned so that the formation of mist is suppressed.

In the accompanying drawings there is shown in

Figure 1, a flow diagram illustrating the process disclosed herein; and in

Figure 2, a modified form of flow diagram.

In the process according to the invention, absorption takes place in a column or tower operating according to the counter current principle, the gases being introduced at the bottom and the liquor at the top. Since the addition of the nitric acid to the continuously circulating ammonium nitrate solution takes place at the top of the counter current device, the ammonia is removed completely from the gases, even in the case of a very low acidity of the solution, and a practically neutral ammonium nitrate solution is obtained at the lower end of the absorption path. It is, of course, also possible to treat the quantity of ammonium nitrate solution corresponding to the production, with the ammoniacal gases in a separate absorption stage before the counter-current device, before the said gases are brought into contact with the ammonium nitrate solution containing nitric acid. The dimensions of the absorption chamber and the gas velocities are adapted so that the ammonium nitrate solution produced is at least neutral but is preferably somewhat alkaline.

Since the gases to be treated contain comparatively little ammonia, large volumes of gas have to be dealt with, so that small quantities of nitric acid vapour may be entrained by the gases from the absorption device. In order to avoid this loss of nitric acid, the gases freed from ammonia are sprayed in a third absorption chamber with alkaline ammonium nitrate solution, so that the last traces of nitric acid are removed from the gases.

The ammonium nitrate solution produced from the ammonia of the gases is reacted with burnt or slaked lime, if desired at an elevated temperature, which will, of course, be partly produced by the liberated heat of reaction. In this known reaction, calcium nitrate solution is produced and gaseous ammonia is formed from the ammonium of the ammonium nitrate.

The escaping ammonia contains water vapour depending upon the temperature employed. In order to obviate the necessity for special steps for drying the ammonia, the ammonia is brought into contact in counter-flow with cold ammonium nitrate solution for reciprocal action, the water vapour of the ammonia gas being made utilizable for heating the solution, while, in accordance with the low temperature of the solution flowing in, no more water vapour is left in the ammonia gas than is admissible or useful for the subsequent utilization of the ammonia.

According to a further form of carrying out the present process, the lime used for the conversion of the ammonium nitrate into calcium nitrate and ammonia may first be employed for removing the hydrogen sulphide which is contained in the gases resulting from the distillation or gasification of fuels. For this purpose, the gases freed in the usual manner from flue dust and tar are washed or scrubbed with milk of lime in a counter current device. This milk of lime consists of a suspension of slaked lime in water. During the absorption process, the lime may be added continuously because the calcium hydrosulphide formed from the hydrogen sulphide and calcium hydroxide is very soluble in water.

The gases completely freed from hydrogen sulphide are treated for removal of the ammonia in the manner described hereinbefore with nitric acid or with an ammonium nitrate solution containing nitric acid. The ammonium nitrate solution produced is reacted with the calcium hydrosulphide solution, if necessary at an elevated temperature. According to the known reaction calcium nitrate is formed, while both the ammonia of the ammonium nitrate and the hydrogen sulphide escape in the form of gas.

Various methods may be employed for separating the ammonia and hydrogen sulphide in the gaseous mixture. It depends chiefly upon the nature of the process employed for the removal of the hydrogen sulphide whether the hydrogen sulphide or the ammonia is first removed from the gaseous mixture. It is possible, for example, to convert the ammonia into strong ammoniacal solution by washing the gaseous mixture with cold water and to obtain from the ammoniacal solution by the injection of air or gases containing oxygen an ammonia-air mixture suitable for catalytic oxidation.

Flow diagrams illustrating the processes disclosed herein are illustrated in the drawings.

The ammoniacal gases are according to Figure 1 passed successively by piping 1, 2 and 3 respectively through the absorption towers 4, 5 and 6. Nitric acid is led through piping 7 into the top of the absorption tower 5, and ammonium nitrate solution is continuously circulated by means of the pump 8 through piping 9 from the bottom of the absorption tower 5 to the top thereof. The ammonium nitrate solution produced flows from the tower 5 through pipe 10 into the tower 4. A part of the ammonium nitrate solution leaving tower 4 through pipe 11 is returned by means of the pump 12 through pipe 13 into the absorption tower 6, from which it flows through line 10' into the absorption tower 5. The gases freed from ammonia leave the tower 6 through pipe 14. The ammonium nitrate solution produced is led through line 15 into the rectification column 16, and from the column 16 through pipe 17 into the reaction vessel 18. Milk of lime is introduced into the vessel 18 through pipe 19. Ammonia and water vapor leaving the vessel 18 through pipe 20 are led into the rectification column 16 from which ammonia leaves through pipe 21, and is carried to an ammonia oxidation and nitric acid plant (not shown). Calcium nitrate solution is led out of the reaction vessel 18 through pipe 22.

According to Figure 2, the ammoniacal gases still containing hydrogen sulphide, are led through pipe 23 into the absorption tower 24, through the top of which milk of lime is introduced by means of the pipe 25. The ammoniacal gases freed from hydrogen sulphide are led from the tower 24 through line 26 into the absorption tower 27, into which nitric acid is introduced through pipe 28. A part of the ammonium nitrate solution may be continuously returned from the bottom of the absorption tower 27 to the top thereof by means of the pump 29 through pipes 30 and 31. The gases freed from ammonia leave the tower 27 by means of pipe 32. The ammonium nitrate solution produced, flows through pipe 33 into the reaction vessel 34, into which the calcium hydrosulphide solution is introduced from the absorption tower 24 by means of pipe 35. Calcium nitrate solution is removed through pipe 36, the ammonia and the hydrogen sulphide escaping out of the vessel 34 through pipe 37. The gaseous mixture of ammonia and hydrogen sulphide is washed by means of cold water in the absorption tower 38, the water being introduced to the top of the tower through pipe 39. Hydrogen sulphide leaves the tower 38 through pipe 40, ammonia and water entering tower 42 through pipe 41, the ammonia being treated in tower 42 by means of air injected through pipe 43. An ammonia air mixture in condition for combustion leaves the tower 42 by means of pipe 44. The ammonia still contained in water leaving the tower 42 through pipe 45 is expelled in the known manner by means of steam.

The result of the process according to the invention, therefore, consists in the first place in the production of a calcium nitrate solution, gaseous ammonia and, if desired, also hydrogen sulphide.

The ammonia is converted in known manner into nitric acid which serves for the absorption of the ammonia. From the hydrogen sulphide, thiosulphates or sulphur may be obtained for example. For the production of sulphur, for example, according to a known process, a third of the hydrogen sulphide gas is mixed with air and the hydrogen sulphide is burned to sulphur dioxide, which after mixing with the untreated portion of the gas reacts with the hydrogen sulphide, with the separation of sulphur.

The method of working up the calcium nitrate solution obtained according to the invention to form calcium nitrate is likewise known. It is expedient for the calcium nitrate solution to contain an excess of calcium oxide. The consequence of this is that the ammonia is completely expelled and the calcium nitrate is obtained in a form more suitable for spreading or scattering and storing.

The process is applicable to all gases obtained from bituminous coal, brown coal, peat, similar bituminous fuels, wood and also gas liquor. The latter is deposited for example from the retort gases after preliminary condensation of the tar and separation of the flue dust by a pre-cooling, ammonia and also hydrogen sulphide being absorbed.

Having now particularly described and ascertained the nature of my said invention and in what manner the same is to be performed, I declare that what I claim is:—

1. A process for the manufacture of calcium nitrate from the ammoniacal gases resulting from the distillation and gasification of fuels and similar ammoniacal gases comprising treating the gases freed from flue dust, tar and hydrogen sulphide with aqueous nitric acid to form ammonium nitrate, reacting the ammonium nitrate solution produced by means of burnt lime to form calcium nitrate solution and gaseous ammonia, and converting said gaseous ammonia by catalytic oxidation into the nitric acid necessary for the absorption of the ammonia.

2. A process for the manufacture of calcium nitrate from the ammoniacal gases resulting from the distillation and gasification of fuels and similar ammoniacal gases comprising treating the gases freed from flue dust, tar and hydrogen sulphide in a separate stage by means of ammonium nitrate solution produced in the process, contacting in a second stage the ammoniacal gases in counter current to ammonium nitrate solution containing nitric acid, and treating in a third stage the gases freed from ammonia with alkaline ammonium nitrate solution, reacting the ammonium nitrate solution produced with burnt lime to form calcium nitrate solution and gaseous ammonia, and converting said gaseous ammonia by catalytic oxidation into the nitric acid necessary for the absorption of the ammonia.

3. A process for the manufacture of calcium nitrate as set forth in claim 1, which comprises the step of bringing the ammonia gas resulting from the reaction of the ammonium nitrate solution with lime into contact in counter flow with the ammonium nitrate solution to be converted.

4. A process for the manufacture of calcium nitrate from the ammoniacal gases resulting from the distillation and gasification of fuels and similar ammoniacal gases comprising treating the gases freed from flue dust and tar with a suspension of burnt or slaked lime (milk of lime) to form calcium hydrosulphide, subjecting the gases freed from hydrogen sulphide to a treatment by means of aqueous nitric acid to form ammonium nitrate, reacting the solutions of calcium hydrosulphide and ammonium nitrate produced, a calcium nitrate solution and a gaseous mixture of hydrogen sulphide and ammonia being formed.

5. A process for the production of calcium nitrate as set forth in claim 4 in which the gaseous mixture of hydrogen sulphide and ammonia obtained is washed by means of cold water to form a strong ammoniacal solution, treating said solution by means of air to produce an ammonia air mixture suitable for catalytic oxidation.

6. A process for the manufacture of calcium nitrate from the ammoniacal gases resulting from the distillation and gasification of fuels and similar ammoniacal gases comprising treating the gases freed from flue dust and tar with a suspension of burnt or slaked lime to form calcium hydrosulphide, treating the ammoniacal gases thus freed from hydrogen sulphide in a separate stage with ammonium nitrate solution produced subsequently in the process, subjecting the ammonical gases thus formed to counter-current treatment with an ammonium nitrate solution containing nitric acid, to form ammonium nitrate, reacting the solutions of calcium hydrosulphide and ammonium nitrate produced to form a calcium nitrate solution and a gaseous mixture of hydrogen sulphide and ammonia, and treating the gases freed from ammonia with alkaline ammonium nitrate solution.

7. A process for the manufacture of calcium nitrate from the ammoniacal gases resulting from the distillation and gasification of fuels and similar ammoniacal gases comprising treating the gases freed from flue dust, tar and hydrogen sulphide with an ammonium nitrate solution containing nitric acid to form ammonium nitrate, reacting the ammonium nitrate solution produced by means of burnt lime to form calcium nitrate solution and gaseous ammonia, and converting said gaseous ammonia by catalytic oxidation into the nitric acid necessary for the absorption of the ammonia.

8. A process for the manufacture of calcium nitrate from the ammoniacal gases resulting from the distillation and gasification of fuels and similar ammoniacal gases comprising treating the gases freed from flue dust and tar with a suspension of burnt or slaked lime to form calcium hydrosulphide, subjecting the gases freed from hydrogen sulphide to a treatment with an ammonium nitrate solution containing nitric acid to form ammonium nitrate, reacting the solutions of calcium hydrosulphide and ammonium nitrate produced, a calcium nitrate solution and a gaseous mixture of hydrogen sulphide and ammonia being formed.

9. A process for the production of calcium nitrate as set forth in claim 8, in which the gaseous mixture of hydrogen sulphide and ammonia obtained is washed by means of cold water to form a strong ammoniacal solution, treating such solution by means of air to produce an ammonia-air mixture suitable for catalytic oxidation.

10. A process for the manufacture of calcium nitrate from the ammoniacal gases resulting from the distillation and gasification of fuels and similar ammoniacal gases comprising treating the gases freed from flue dust and tar with a suspension of burnt or slaked lime to form calcium hydrosulphide, treating the ammoniacal gases free from hydrogen sulphide in a separate stage by means of ammonium nitrate solution, subjecting the gases freed from hydrogen sulphide to counter-current treatment with an ammonium nitrate solution containing nitric acid, to form ammonium nitrate, reacting the solutions of calcium hydrosulphide and ammonium nitrate produced, a calcium nitrate solution and a gaseous mixture of hydrogen sulphide and ammonium being formed, and treating in a separate stage the gases freed from ammonia with alkaline ammonium nitrate solution.

HARRY PAULING.